United States Patent
Kuo et al.

(10) Patent No.: US 9,552,365 B2
(45) Date of Patent: Jan. 24, 2017

(54) SECURE SYNCHRONIZATION APPARATUS, METHOD, AND NON-TRANSITORY COMPUTER READABLE STORAGE MEDIUM THEREOF

(71) Applicant: Institute For Information Industry, Taipei (TW)

(72) Inventors: Yen-Hung Kuo, Taipei (TW); Yu-Lin Jeng, Tainan (TW)

(73) Assignee: Institute For Information Industry, Taipei (TW)

( * ) Notice: Subject to any disclaimer, the term of this patent is extended or adjusted under 35 U.S.C. 154(b) by 209 days.

(21) Appl. No.: 14/292,901

(22) Filed: May 31, 2014

(65) Prior Publication Data
US 2015/0347448 A1 Dec. 3, 2015

(51) Int. Cl.
*G06F 17/30* (2006.01)
*G06Q 50/18* (2012.01)
*G06F 21/62* (2013.01)
*H04L 29/06* (2006.01)

(52) U.S. Cl.
CPC ..... *G06F 17/30174* (2013.01); *G06F 21/6218* (2013.01); *G06F 21/6281* (2013.01); *G06Q 50/184* (2013.01); *H04L 63/101* (2013.01)

(58) Field of Classification Search
CPC combination set(s) only.
See application file for complete search history.

(56) References Cited

U.S. PATENT DOCUMENTS

| | | |
|---|---|---|
| 6,826,662 B2 | 11/2004 | Suzuoki et al. |
| 7,490,109 B1 | 2/2009 | Sikchi et al. |
| 7,702,692 B2 | 4/2010 | Chandrasekaran |
| 7,908,653 B2 | 3/2011 | Brickell et al. |

(Continued)

FOREIGN PATENT DOCUMENTS

| | | |
|---|---|---|
| CN | 101964798 A | 2/2011 |
| TW | 200507571 A | 2/2005 |
| TW | 200807986 A | 2/2008 |

OTHER PUBLICATIONS

Office Action to the corresponding Taiwan Patent Application rendered by the Taiwan Intellectual Property Office (TIPO) on Feb. 26, 2016, 7 pages (including English translation).

*Primary Examiner* — Etienne Leroux
(74) *Attorney, Agent, or Firm* — Skaar Ulbrich Macari, P.A.

(57) ABSTRACT

A secure synchronization apparatus, method, and non-transitory computer readable storage medium thereof are provided. The secure synchronization apparatus of the present invention includes a storage unit, an interface, and a processing unit. The interface is electrically connected to a storage server via a network. The processing unit is electrically connected to the storage unit and the interface. The processing unit is configured to execute an operating system and execute an agent program installed on the operating system. The agent program configures an isolated space, manages an extended space within the storage unit, and synchronizes an object between the isolated space, extended space, and the storage server through the interface. The isolated space and the extended space are only recognized by the agent program installed on the operating system and the object in the two spaces is accessible only via the agent program.

21 Claims, 9 Drawing Sheets

(56) References Cited

U.S. PATENT DOCUMENTS

| | | |
|---|---|---|
| 7,979,891 B2 | 7/2011 | Smithline |
| 8,190,947 B1 * | 5/2012 | Holl .................... G06F 11/1435 |
| | | 709/203 |
| 8,224,796 B1 | 7/2012 | Shinde et al. |
| 8,224,934 B1 | 7/2012 | Dongre et al. |
| 8,266,378 B1 * | 9/2012 | Jevans ................ G06F 12/1466 |
| | | 711/115 |
| 8,275,791 B2 | 9/2012 | Raffaele et al. |
| 8,448,255 B2 | 5/2013 | Jothimani |
| 8,468,600 B1 | 6/2013 | Kaskel et al. |
| 8,528,083 B2 | 9/2013 | Lewis |
| 8,627,451 B2 | 1/2014 | Walsh et al. |
| 2001/0054157 A1 * | 12/2001 | Fukumoto ........... H04L 63/0281 |
| | | 726/11 |
| 2003/0195904 A1 * | 10/2003 | Chestnut ............. G06F 21/6227 |
| 2004/0250130 A1 | 12/2004 | Billharz et al. |
| 2012/0078855 A1 * | 3/2012 | Beatty ................. G06F 11/1451 |
| | | 707/676 |
| 2012/0143862 A1 * | 6/2012 | Jones ................ G06F 17/30699 |
| | | 707/732 |
| 2013/0060842 A1 | 3/2013 | Grossman |

* cited by examiner

SECURE SYNCHRONIZATION APPARATUS, METHOD, AND NON-TRANSITORY COMPUTER READABLE STORAGE MEDIUM THEREOF

FIELD

The present invention relates to secure synchronization apparatus, method, and non-transitory computer readable storage medium thereof; more particularly, the present invention relates to secure synchronization apparatus, method, and non-transitory computer readable storage medium thereof that configure an isolated space.

BACKGROUND

Due to the rapid development of technology, people nowadays tend to use electronic devices (e.g. computers, digital cameras, etc.) to record various kinds of information. In the meantime, with the emergence of different types of data storage media (e.g. external portable hard drives, universal serial bus (USB) drives, storage servers, etc.), people can copy and/or make backups of electronic objects (e.g. files, folders, etc.) easily.

From the viewpoint of enterprises, electronic objects created and received by employees of an enterprise are intellectual property of this enterprise. Hence, the easier that an electronic object can be copied and/or be made backups, the higher possibility that intellectual property of enterprises will be leaked out. To secure intellectual property, technologies such as remote desktop services, web-based editing tools, and digital right management have been developed. Each of these technologies is briefly discussed below.

Regarding the technology of remote desktop services, a remote desktop client application has to be installed on a client device. On the client device, a user can view or even control the desktop session on another remote machine, where the remote desktop server is running A remote desktop service provides a secure environment, where is capable for almost all applications and corresponding functions by a network control session manner. However, remote desktop services are protocol dependent, and they may have poor performance and heavily consume network bandwidth. When the network is congested, the performance of a remote desktop service will be degraded dramatically. Regarding web-based editing tools, they support fewer data types and have fewer functions comparing to legacy editing tools. As to digital right management (DRM) used by Apple's iTunes store, Google's Play store, etc., only true closed platform can protect electronic objects and resources, but users may resistant in using such kinds of DRM technologies when control policies of true closed platforms hurting conveniences of using the DRM protected applications.

According to the above descriptions, technologies such as remote desktop services, web-based editing tools, and digital right management all have shortcomings Therefore, technologies that can easily copy and/or make backups of electronic files as well as secure intellectual property are still in an urgent need.

SUMMARY

An objective of certain embodiments of the present invention includes providing a secure synchronization apparatus, which comprises a storage unit, an interface, and a processing unit. The interface is electrically connected to a storage server via a network. The processing unit is electrically connected to the storage unit and the interface. The processing unit is configured to execute an operating system and execute an agent program installed on the operating system. The agent program configures an isolated space within the storage unit and synchronizes an object between the isolated space and the storage server through the interface. The isolated space is only recognized by the agent program installed on the operating system and the object in the isolated space is accessible only via the agent program.

Another objective of certain embodiments of the present invention includes providing a secure synchronization method, which is for use in an electronic device. The electronic device is electrically connected to a storage server via a network. The secure synchronization method comprises the steps of (a) executing an operating system, (b) executing an agent program installed on the operating system, (c) configuring an isolated space within the electronic device by the agent program, and (d) synchronizing an object between the isolated space and the storage server through the interface by the agent program. The isolated space is only recognized by the agent program installed on the operating system and the object in the isolated space is accessible only via the agent program.

Yet another objective of certain embodiments of the present invention includes providing a non-transitory computer readable storage medium, which has a computer program stored therein. The computer program executes a secure synchronization method after being loaded into an electronic device. The electronic device is electrically connected to a storage server via a network. The secure synchronization method comprises the following steps of (a) executing an operating system, (b) executing an agent program installed on the operating system, (c) configuring an isolated space within the electronic device by the agent program, and (d) synchronizing an object between the isolated space and the storage server through the interface by the agent program. The isolated space is only recognized by the agent program installed on the operating system and the object in the isolated space is accessible only via the agent program.

Briefly speaking, certain embodiments of the present invention include an agent program installed and executed on an operating system. The agent program configures an isolated space and synchronizes any object between the isolated space and a storage server. The isolated space is only recognized by the agent program installed on the operating system, so any object stored in the isolated space is accessible only via the agent program. As a consequence, the isolated space can be deemed as a secure space for storing objects, and the secure synchronization between the isolated space and the storage server can be achieved.

In addition, the agent program is able to monitor every input/output operation of the object(s) stored in the isolated space; hence, the agent program can prevent an unauthorized input/output operation being performed on the object(s) stored in the isolated space. As a result, intellectual property management can be achieved. In the meantime, users can still enjoy the rich functionalities provided by the applications installed on the operating system in a client device.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the secure synchronization apparatus, method, and non-transitory computer readable storage medium thereof will be explained with reference to example embodiments thereof. Nevertheless, these example embodiments are not intended to limit the present invention to any specific examples, embodiments, environments, applications, or implementations described in these embodiments. Therefore, the description of these example embodiments is only for the purpose of illustration rather than to limit the scope of the present invention. It shall be appreciated that elements not directly related to the present invention are omitted from depictions in the following embodiments and attached drawings.

Figure 1:
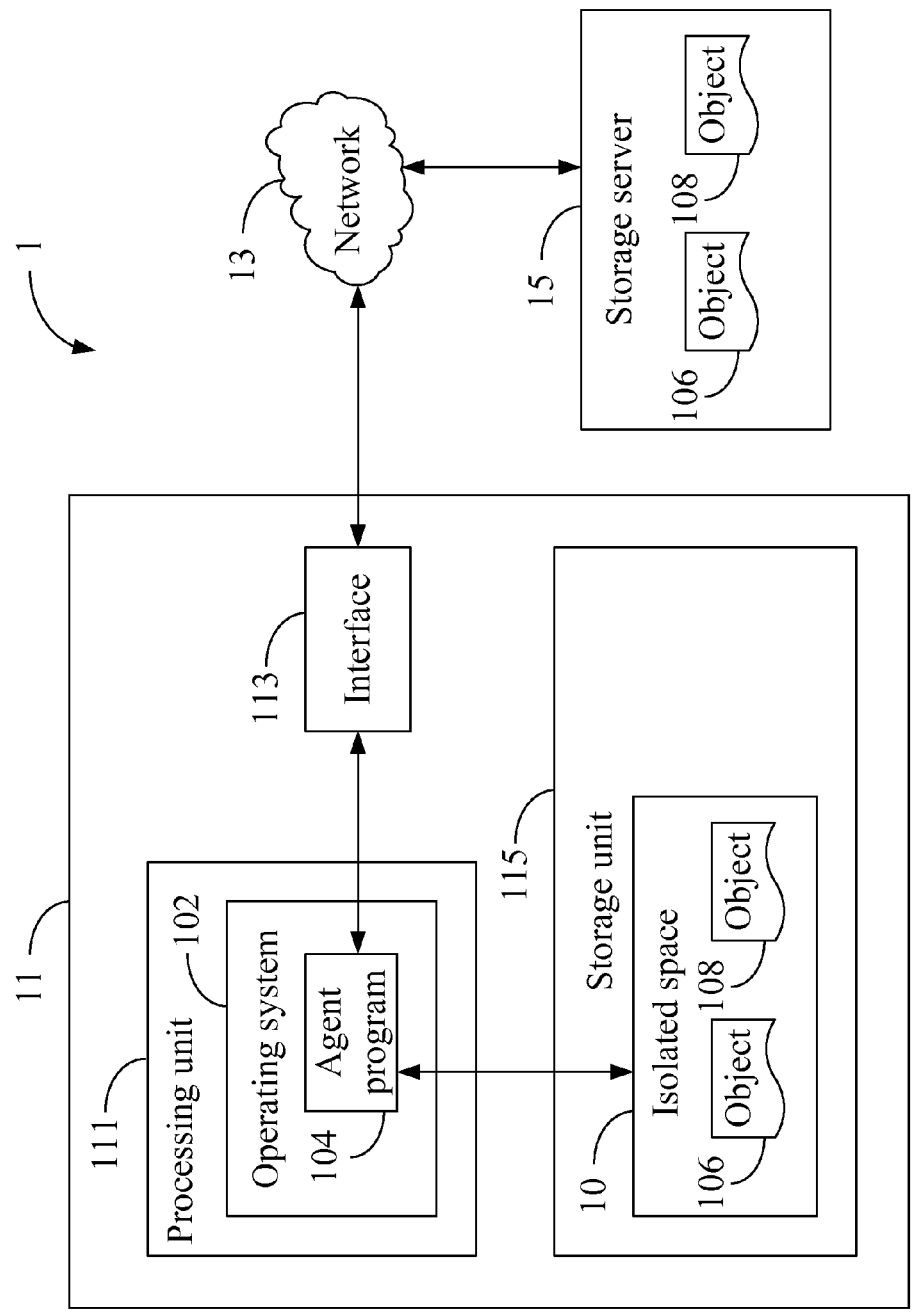
FIG. 1 is a schematic view of the system of a first embodiment of the present invention.

A first embodiment of the present invention is a system 1 for secure synchronization, a schematic view of which is illustrated in FIG. 1. The system 1 comprises a secure synchronization apparatus 11, a network 13, and a storage sever 15. The secure synchronization apparatus 11 comprises a processing unit 111, an interface 113, and a storage unit 115. The processing unit 111 is electrically connected to the interface 113 and the storage unit 115, while the interface 113 is electrically connected to the storage server 15 via the network 13.

The processing unit 111 may be any of various processors, central processing units (CPUs), microprocessors, or other computing devices well known to those of ordinary skill in the art. The interface 113 may be any interface that is capable of receiving and transmitting signals through various kinds of network. The storage unit 115 may be a memory, a Universal Serial Bus (USB) disk, a hard disk, a compact disk (CD), a mobile disk, a magnetic tape, a database, or any other storage media or circuit with the same function and well known to those of ordinary skill in the art.

The processing unit 111 executes an operating system 102 and executes an agent program 104 installed on the operating system 102. In other words, the agent program 104 is running on top of the operating system 102; the agent program 104 is one layer above the operating system 102. The agent program 104 configures an isolated space 10 within the storage unit 115. It is emphasized that above the operation system 102, the isolated space 10 is only recognized by the agent program 104. Therefore, any other application installed on the operating system 102 in the secure synchronization apparatus 11 is unaware of the existence of the isolated space 10.

The agent program 104 synchronizes any object between the isolated space 10 and the storage server 15 through the interface 113, wherein an object may be a file or a folder. To be more specific, the agent program 104 may synchronize an object from the isolated space 10 to the storage sever 15 or from the storage server 15 to the isolated space 10 when it is necessary (e.g. when an object has been modified or created, when a scheduled time comes, etc.). For example, a user may create an object 106 in the isolated space 10 through the agent program 104, and the agent program 104 then synchronizes the object 106 from the isolated space 10 to the storage server 15. Yet as another example, the agent program 104 determines that the isolated space 10 has no copy of the object 108, so the agent program 104 synchronizes the object 108 from the storage server 15 to the isolated space 10.

Since the isolated space 10 is only recognized by the agent program 104 installed on the operating system 102, any object stored in the isolated space 10 (including the objects 106, 108) is accessible only via the agent program 104. As a result, the isolated space 10 can be deemed as a secure space for storing objects, and the secure synchronization between the secure synchronization apparatus 11 and the storage server 15 can be achieved.

In some embodiments, the agent program 104 may further prevent an unauthorized input/output operation being performed on the object(s) stored in the isolated space 10 (including the objects 106, 108) by monitoring every input/output operation of the object(s) stored in the isolated space 10. An unauthorized input/output operation is an input/output operation that transmits and/or copies an object from the isolated space 10 to an unauthorized destination, such as attaching an object stored in the isolated space 10 to an e-mail, copying an object stored in the isolated space 10 to a USB drive, etc. Since the agent program 104 monitors every input/output operation of the object(s) stored in the isolated space 10, the agent program 104 is able to (a) intercept an input/output operation that intends to access an object stored in the isolated space 10, (b) determine that the input/output operation is unauthorized, and (c) ignore this unauthorized input/output operation based on the determination result.

For example, the agent program 104 intercepts an input/output operation that intends to access the object 106 stored in the isolated space 10 and figures out the destination of the object 106 according to the input/output operation. The agent program 104 determines whether the destination is an authorized destination. If the destination is an authorized destination, the agent program 104 will let the input/output operation access the object 106. On the contrary, if the destination is an unauthorized destination, the agent program 104 ignores this unauthorized input/output operation. It is noted that different users/enterprises may require different security levels; hence, unauthorized destination(s) and unauthorized input/output operation(s) may vary from case to case.

Briefly speaking, the agent program 104 configures an isolated space 10 within the storage unit 115 and synchronizes any object between the isolated space 10 and the storage server 15 through the interface 113. Since any object stored in the isolated space 10 is accessible only via the agent program 104, the isolated space 10 can be deemed as a secure space for storing objects, and the secure synchronization between the secure synchronization apparatus 11 and the storage server 15 can be achieved. Moreover, by monitoring every input/output operation of the object(s) stored in the isolated space 10, the agent program 104 is able to prevent an unauthorized input/output operation being performed on the object(s) stored in the isolated space 10. Intellectual property management therefore can be achieved.

Figure 2:
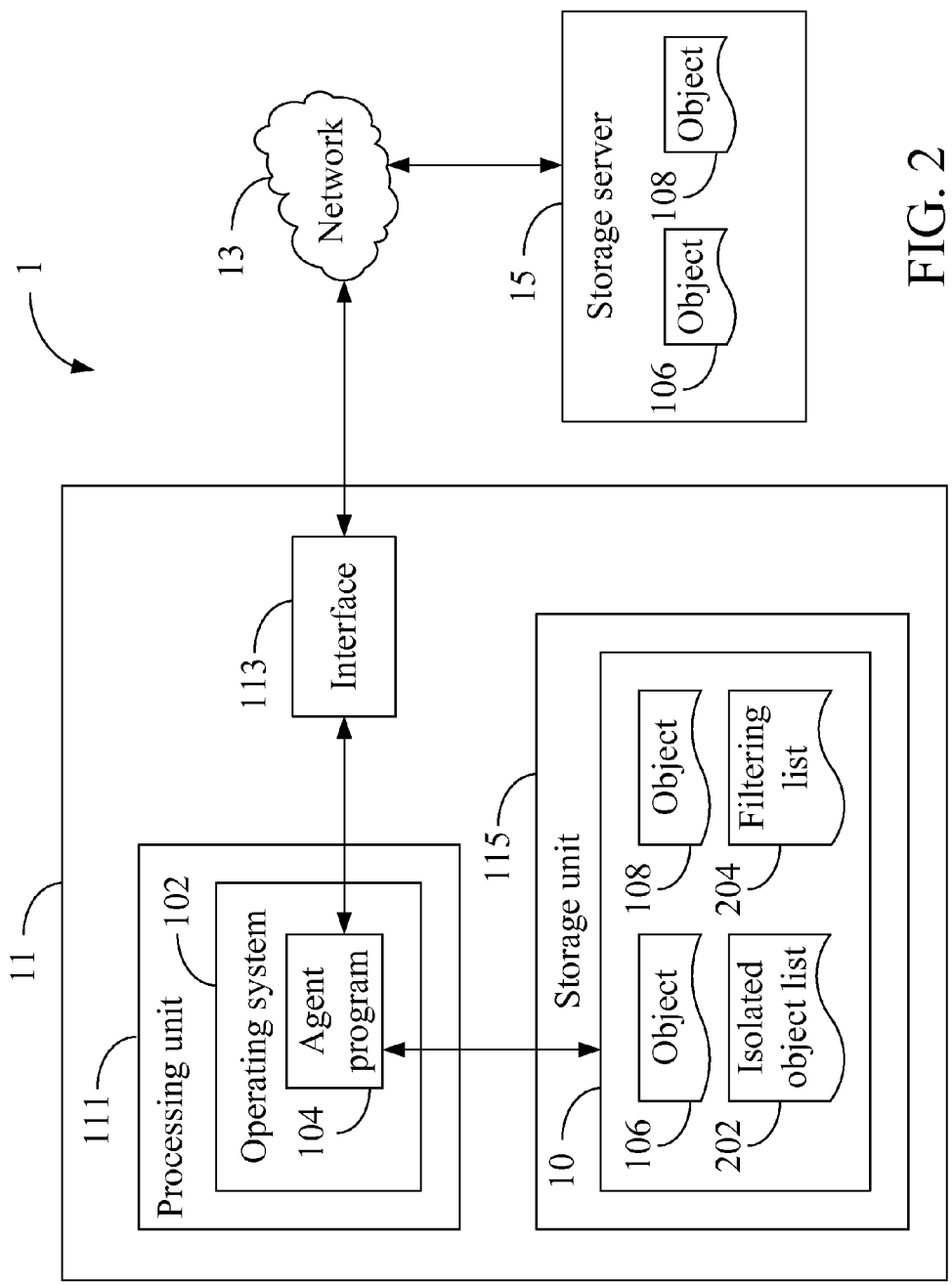
FIG. 2 is a schematic view of the system of a second embodiment of the present invention.

Please refer to FIG. 2 for a second embodiment of the present invention. In the second embodiment, the secure synchronization apparatus 11 is able to execute the operations, have the functionalities, and achieve the same results as those described in the first embodiment. In the following descriptions, only the differences between the first embodiment and the second embodiment are addressed.

In this embodiment, the isolated space 10 is further stored with an isolated object list 202 that is used for recording a piece of information for each object stored in the isolated space 10. Each piece of information may be a name of an object, a directory of an object, or any information that can uniquely identify an object. The piece of information of an object may be recorded to the isolated object list 202 when an object is created or modified. For example, the agent program 104 records a name of the object 106 in the isolated object list 202 after the object created by a user through the agent program 104. Yet as another example, the agent program 104 records a name of the object 108 in the isolated object list 202 after the agent program 104 synchronizes the object 108 from the storage server 15 to the isolated space 10. In this way, the agent program 104 is able to know and recognize the exact object(s) being stored in the isolated space 10 in an efficient way.

In this embodiment, the isolated space 10 is also stored with a filtering list 204. The filtering list 204 records at least one rule regarding authorized operation(s) and/or unauthorized operation(s). Hence, after the agent program 104 intercepts an input/output operation that intends to access an object stored in the isolated space 10, the agent program 104 determines whether the input/output operation is an authorized operation or an unauthorized operation according to at least one rule in the filtering list 204.

Although both the isolated object list 202 and the filtering list 204 are stored in the isolated space 10 in this embodiment, please note that some other embodiments may have no isolated object list 202 stored in the isolated space 10 or no filtering list 204 stored in the isolated space 10 depending on the scenario required by the user/enterprise.

From the above descriptions, it is learned that the second embodiment provides a refined mechanism for secure synchronization and intellectual property management.

Figure 3:
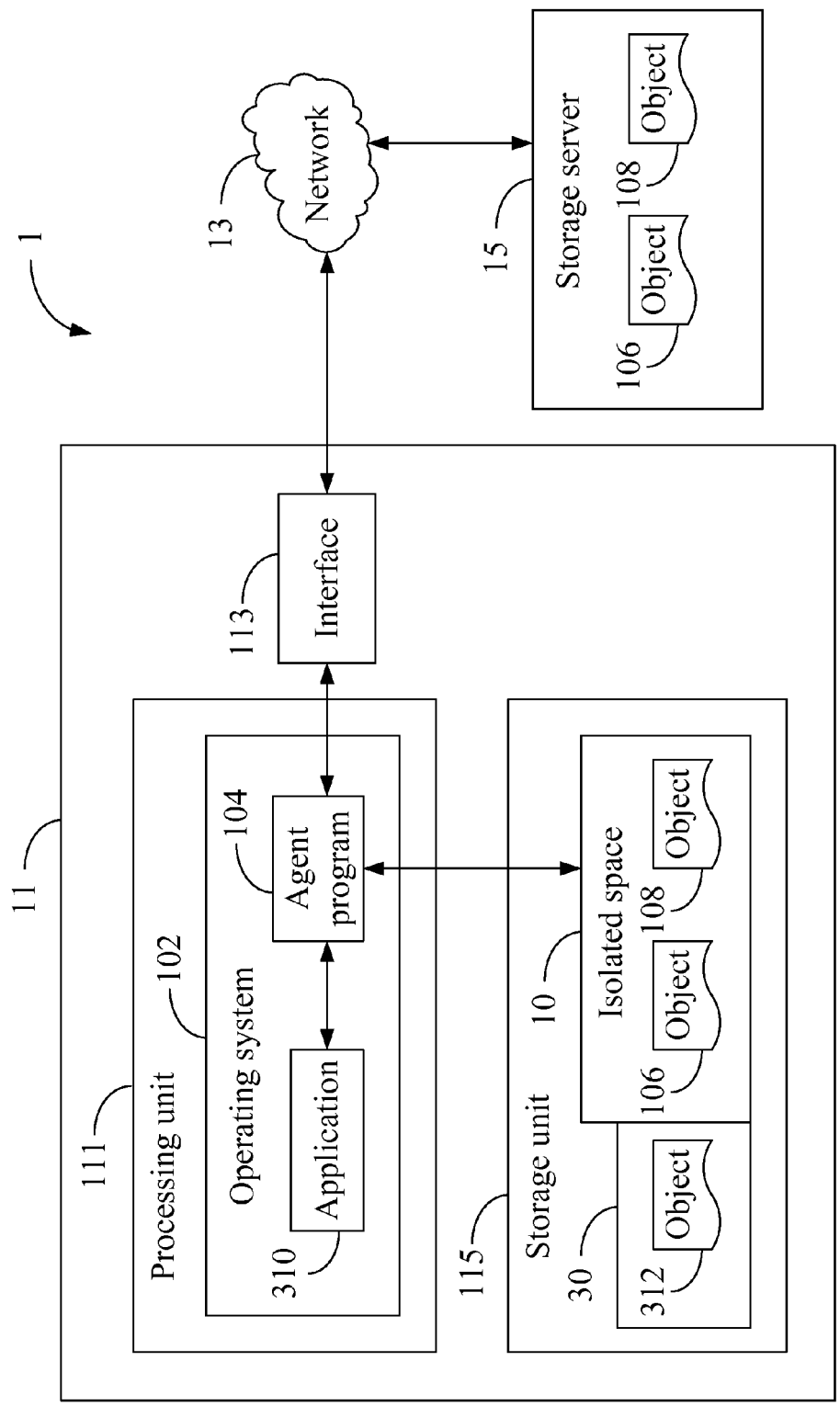
FIG. 3 is a schematic view of the system of a third embodiment of the present invention.

Please refer to FIG. 3 for a third embodiment of the present invention. In the third embodiment, the secure synchronization apparatus 11 is able to execute the operations, have the functionalities, and achieve the same results as those described in the first embodiment. In the following descriptions, only the differences between the first embodiment and the third embodiment are addressed.

In this embodiment, the processing unit 111 further executes an application 310 installed on the operating system 102. The application 310 is unaware of the existence of the isolated space 10 and, hence, cannot access the object(s) stored in the isolated space 10 (including the objects 106, 108) directly. Nevertheless, the application 310 can access the object(s) stored in the isolated space 10 via the agent program 104. When the agent program 104 receives an access request of an object (e.g. the object 106) from the application 310, the agent program 104 further provisions the object to the application 310 in the isolated space 10.

For example, a user may browse the object(s) stored in the isolated space 10 via the agent program 104 and then clicks a particular object (e.g. the object 106, which may be a Microsoft word document) via a mouse. Under this circumstance, the agent program 104 receives an access request of this particular object (e.g. the object 106) from the application 310 (e.g. Microsoft word application) and then provisions the object to the application 310 in the isolated space 10. Please note that the aforesaid example is not used to limit the scope of the present invention. An application may access the object(s) stored in the isolated space 10 via the agent program 104 by other approaches.

There are occasions that the object(s) stored in the isolated space 10 is modified (e.g. the user edits the object 106 via the application 310). When any object (e.g. the object 106) stored in the isolated space 10 is modified, the agent program 104 will determine that the object(s) has been modified, stores the modified object in the isolated space 10, and synchronizes the modified object from the isolated space 10 to the storage server 15 through the interface 113.

There are occasions that the agent program 104 stores another object 312 outside the isolated space 10 and inside the storage unit 115. For example, the user modifies the object 106 stored in the isolated space 10 via the application 310 through the agent program 312 and then stores the modified object outside the isolated space 10 and inside the storage unit 115 as the object 312. The space stored with the object 312 is deemed as an extended space 30. When this kind of occasions happen, the extended space 30 becomes only recognized by the agent program 104 installed on the operating system 102 and the object 312 in the extended space 30 is accessible only via the agent program 104.

Please note that the extended space 30 is extendible. The extended space 30 is extended when the agent program 104 stores another object(s) (not shown) outside the isolated space 10 and inside the storage unit 115 again. The extended space 30 is extended to comprise the spaces storing the object 312 and the another object(s). The extended space 30 after being extended still only recognized by the agent program 104 installed on the operating system 102 and the object 312 and the another object(s) in the extended space 30 after being extended is accessible only via the agent program 104.

By having the agent program 104 set between the application 310 and the object(s) stored in the isolated space 10, the application 310 can access the object(s) stored in the isolated space 10 under the control of the agent program 104. Since any access of the object(s) stored in the isolated space 10 by the application 310 is monitored by the agent program 104, any unauthorized operation trying to access the object(s) stored in the isolated space 10 can be prevented. In addition, the space monitored by the agent program 104 is extensible, which provides more flexibility to users.

Figure 4:
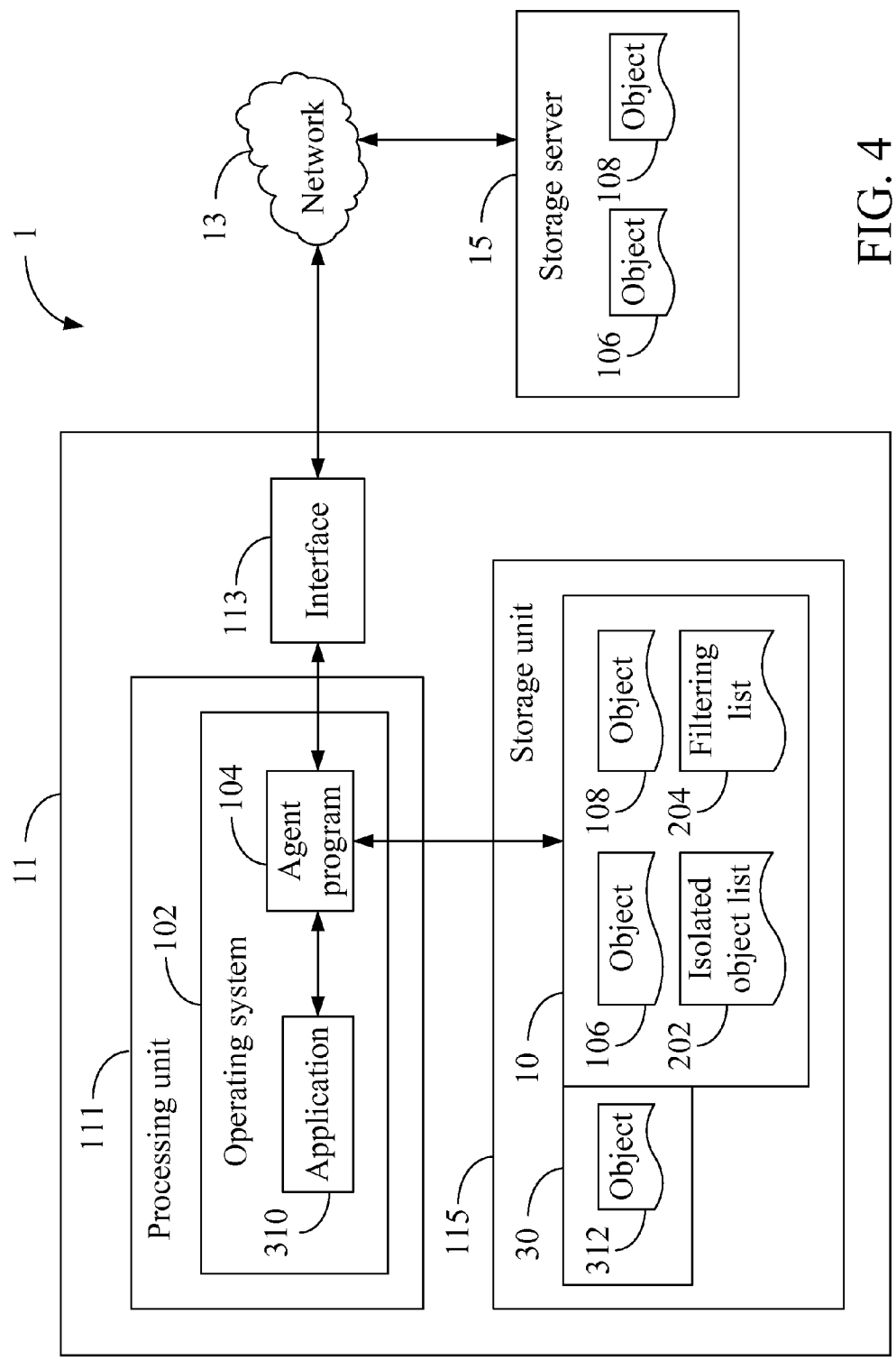
FIG. 4 is a schematic view of the system of a fourth embodiment of the present invention.

Please refer to FIG. 4 for a fourth embodiment of the present invention. In the fourth embodiment, the secure synchronization apparatus 11 is able to execute the operations, have the functionalities, and achieve the same results as those described in the third embodiment. In the following descriptions, only the differences between the third embodiment and the fourth embodiment are addressed.

In this embodiment, the isolated space 10 is further stored with an isolated object list 202 and a filtering list 204. Briefly speaking, the isolated object list 202 is used for recording a piece of information for each object stored in the isolated space 10 and the extended space 30 so that the agent program 104 can know and recognize the exact object(s) stored in the isolated space 10 and extended space 30 in an efficient way. As mentioned in details of the third embodiment, the scope of the extended space 30 can be extended by causing operations being performed on object(s) stored in the isolated space 10 and/or extended space 30. Hence, the isolated object list 202 will be updated accordingly by the agent program 104 whenever the scope of the extended space 30 changed. The filtering list 204 records at least one rule regarding authorized operation(s) and/or unauthorized operation(s). Hence, the agent program 104 can determine whether an intercepted input/output operation is an authorized operation or an unauthorized operation accordingly. As the contents and the roles of the isolated object list 202 and the filtering list 204 have been addressed in the second embodiments; hence, the details are not repeated herein.

Similarly, although both the isolated object list 202 and the filtering list 204 are stored in the isolated space 10 in this embodiment, please note that some other embodiments may have no isolated object list 202 stored in the isolated space 10 or no filtering list 204 stored in the isolated space 10 depending on the scenario required by the user/enterprise.

From the above descriptions, it is learned that the fourth embodiment provides a more refined and flexible mechanism for secure synchronization and intellectual property management.

Figure 5:
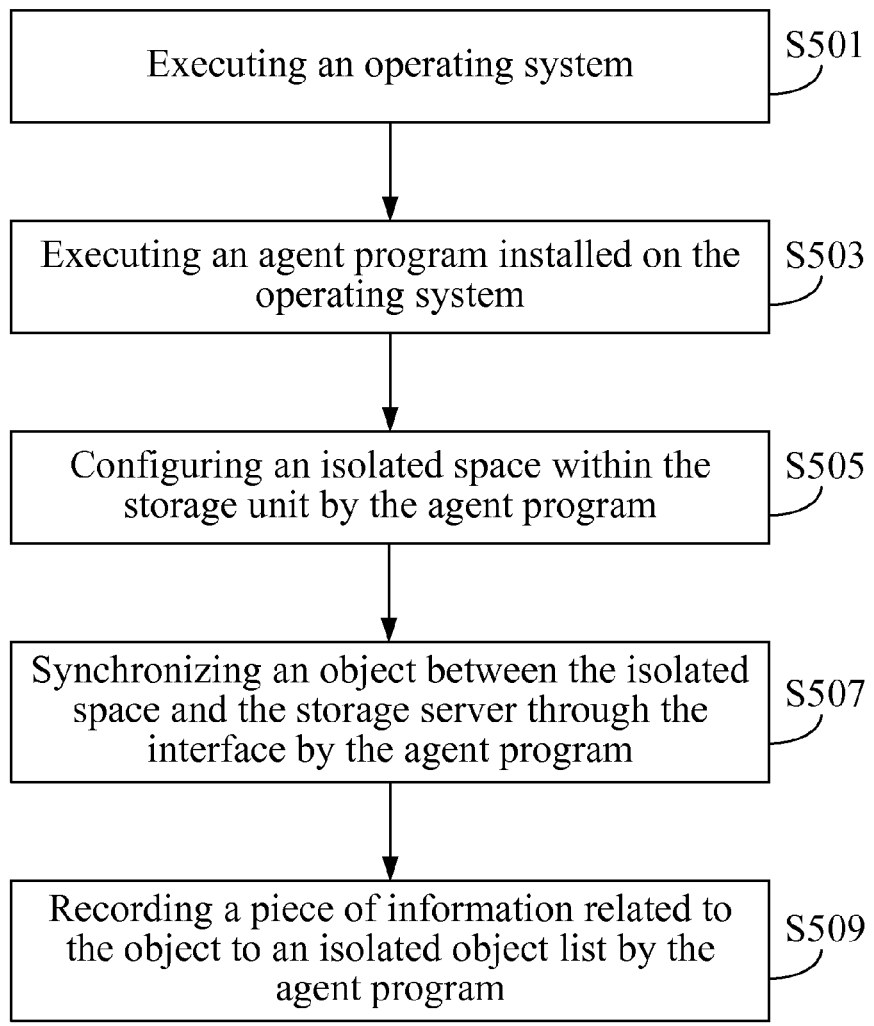
FIG. 5 is a flowchart of the secure synchronization method of a fifth embodiment of the present invention.

A fifth embodiment of the present invention is a secure synchronization method and a flowchart of which is illustrated in FIG. 5. The secure synchronization method is for use in an electronic device (e.g. the secure synchronization apparatus 11 in the first and second embodiments). The electronic device is electrically connected to a storage server via a network.

First, step S501 is executed by the electronic device for executing an operating system in the electronic device. Next, step S503 is executed by the electronic device for executing an agent program installed on the operating system. Following that, step S505 is executed by the agent program for configuring an isolated space within the storage unit. It is noted that the isolated space configured in the step S505 is only recognized by the agent program installed on the operating system.

Next, step S507 is executed by the agent program for synchronizing an object between the isolated space and the storage server through the interface. The object may be a file or a folder. The synchronization may be from the isolated space to the storage sever or from the storage server to the isolated space. For example, when a user creates an object in the isolated space via the agent program in another step (not shown), the step S507 is executed by the agent program for synchronizing the object from the isolated space to the storage server. Yet as another example, when the agent program executes another step (not shown) for determining that the isolated space has no copy of an object stored in the storage server, the step S507 synchronizes the object from the storage server to the isolated space. As mentioned, the isolated space is only recognized by the agent program installed on the operating system; hence, the object in the isolated space is accessible only via the agent program.

Next, step S509 is executed by the agent program for recording a piece of information related to the object to an isolated object list, wherein the isolated object list is stored within the isolated space. The piece of information related to the object may be any information that can uniquely identify the object. With the isolated object list, the agent program is able to know and recognize the exact object(s) stored in the isolated space in an efficient way. However, please note that the step S509 may be omitted in some other embodiments.

In addition to the aforesaid steps, the fifth embodiment can also execute all the operations and have all functionalities set forth in the first and second embodiments. The fifth embodiment executing these operations and having these functionalities will be readily appreciated by those of ordinary skill in the art based on the explanation of the first and second embodiments, and thus will not be further described herein.

Figure 6:
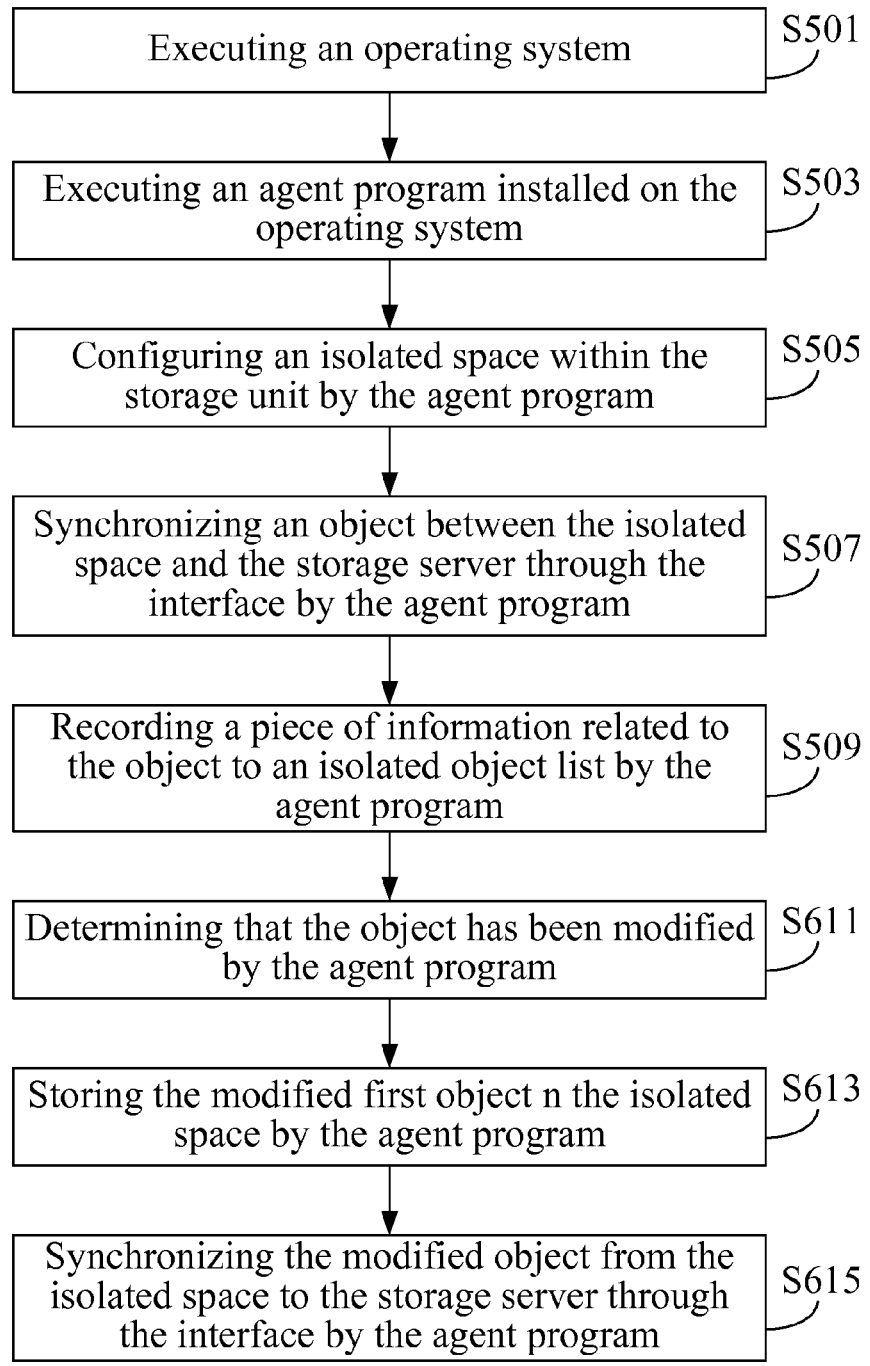
FIG. 6 is a flowchart of the secure synchronization method of a sixth embodiment of the present invention.

A sixth embodiment of the present invention is a secure synchronization method and a flowchart of which is illustrated in FIG. 6. The secure synchronization method is for use in an electronic device (e.g. the secure synchronization apparatus 11 in the first and second embodiments). The electronic device is electrically connected to a storage server via a network.

In this embodiment, the secure synchronization method executes step S501 to S509, whose details are not repeated herein. Following that, step S611 is executed by the agent program for determining that the object has been modified. Next, step S613 is executed by the agent program for storing the modified object in the isolated space. After that, step S615 is executed by the agent program for synchronizing the modified object from the isolated space to the storage server through the interface.

In addition to the aforesaid steps, the sixth embodiment can also execute all the operations and have all functionalities set forth in the first and second embodiments. The sixth embodiment executing these operations and having these functionalities will be readily appreciated by those of ordinary skill in the art based on the explanation of the first and second embodiments, and thus will not be further described herein.

Figure 7:
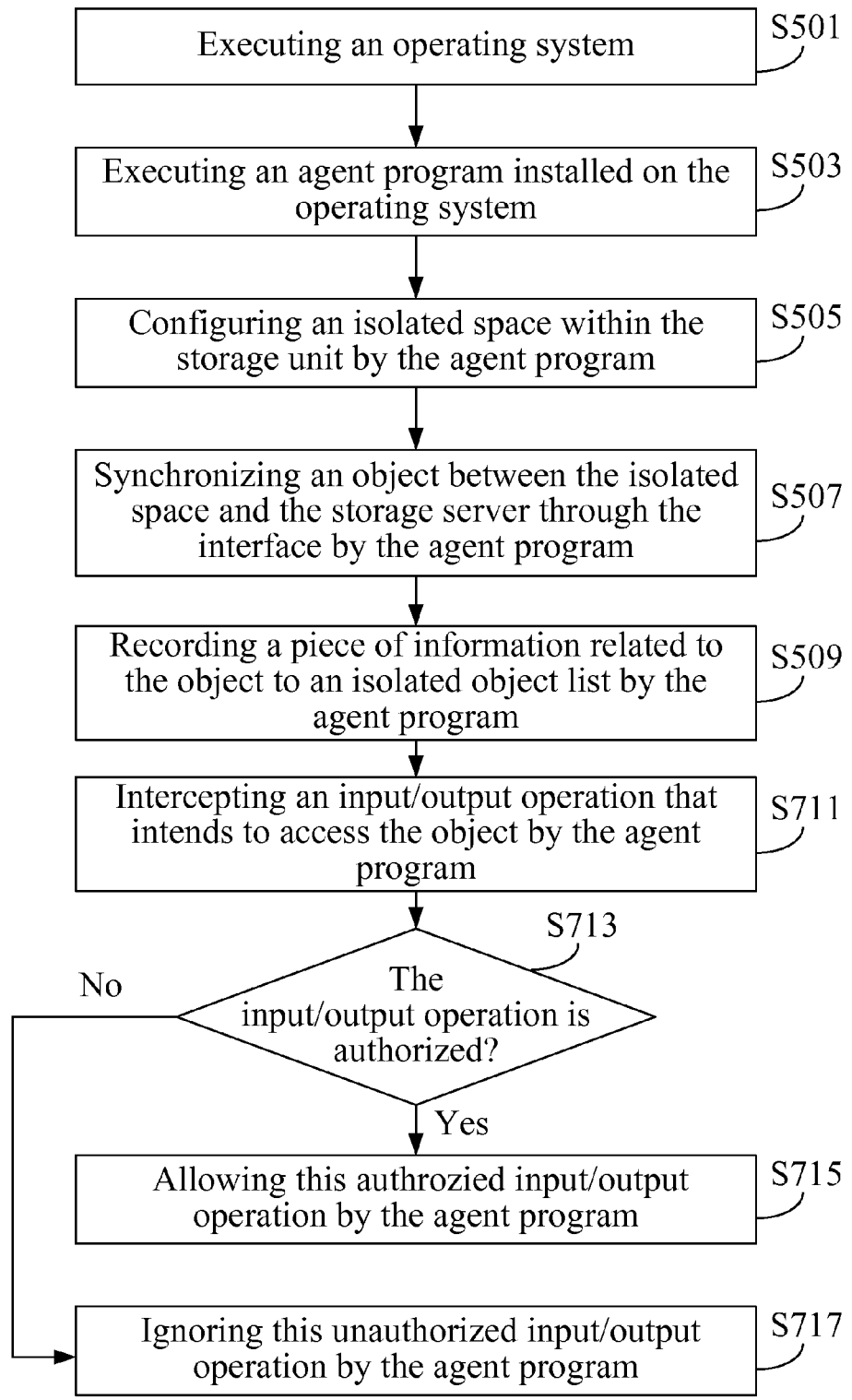
FIG. 7 is a flowchart of the secure synchronization method of a seventh embodiment of the present invention.

A seventh embodiment of the present invention is a secure synchronization method and a flowchart of which is illustrated in FIG. 7. The secure synchronization method is for use in an electronic device (e.g. the secure synchronization apparatus 11 in the first and second embodiments). The electronic device is electrically connected to a storage server via a network.

In this embodiment, the secure synchronization method executes step S501 to S509, whose details are not repeated herein. Following that, the agent program prevents an unauthorized input/output operation being performed on the object by monitoring every input/output operation of the object by the agent program. To be more specific, step S711 is executed by the agent program for intercepting an input/output operation that intends to access the object. Next, step S713 is executed by the agent program for determining whether the input/output operation is authorized. If the agent program determines that the input/output operation is authorized, step S715 is executed by the agent program for allowing this authorized input/output operation. On the contrary, if the agent program determines that the input/output operation is unauthorized, step S717 is executed by the agent program for ignoring this unauthorized input/output operation.

In some other embodiments, the isolated space may be stored with a filtering list. The filtering list records at least one rule regarding authorized operation(s) and/or unauthorized operation(s). Hence, the step S713 determines whether the input/output operation is authorized or unauthorized according to the at least one rule in the filtering list.

In addition to the aforesaid steps, the seventh embodiment can also execute all the operations and have all functionalities set forth in the first and second embodiments. The seventh embodiment executing these operations and having these functionalities will be readily appreciated by those of ordinary skill in the art based on the explanation of the first and second embodiments, and thus will not be further described herein.

Figure 8:
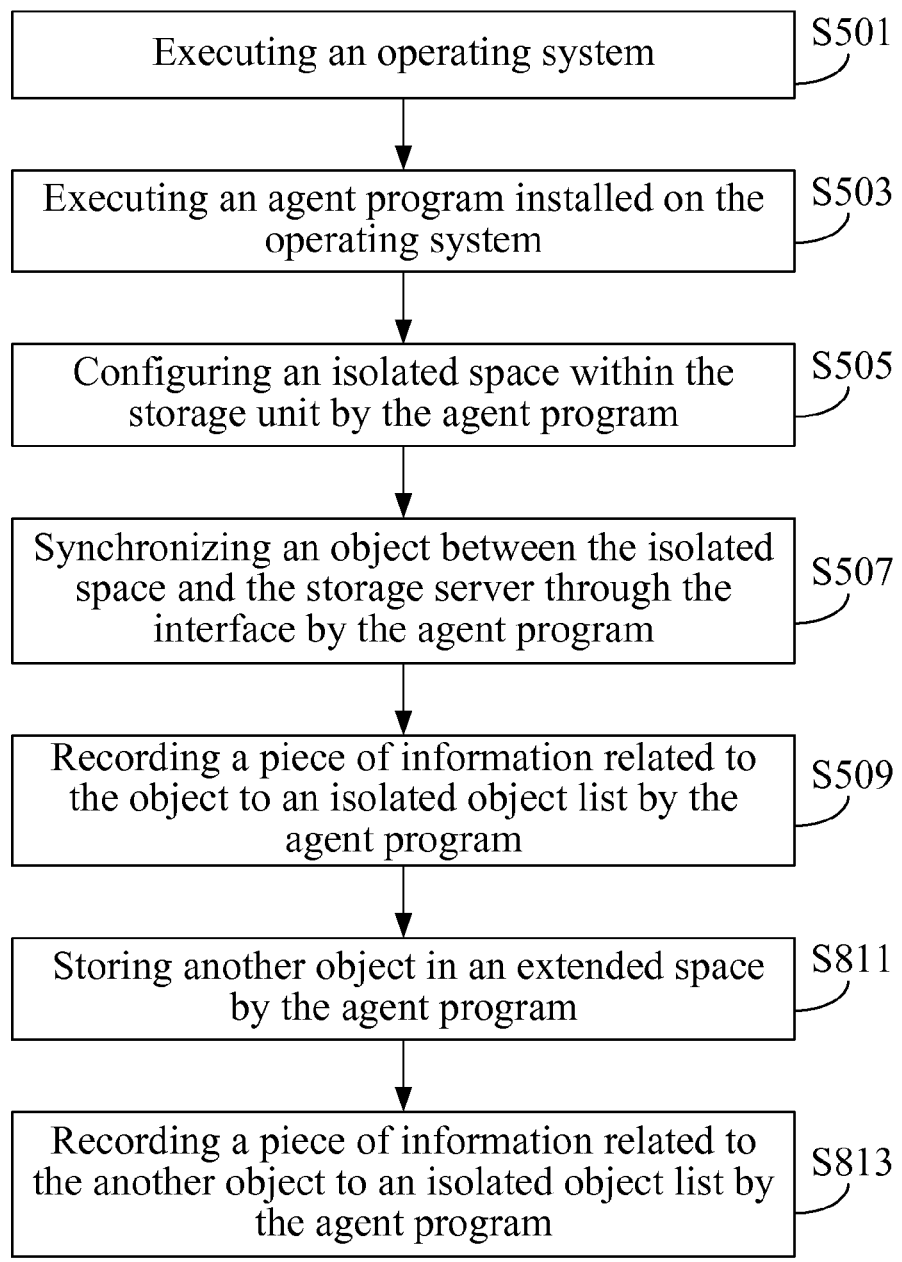
FIG. 8 is a flowchart of the secure synchronization method of an eighth embodiment of the present invention.

An eighth embodiment of the present invention is a secure synchronization method and a flowchart of which is illustrated in FIG. 8. The secure synchronization method is for use in an electronic device (e.g. the secure synchronization apparatus 11 in the third embodiment). The electronic device is electrically connected to a storage server via a network.

In this embodiment, the secure synchronization method executes step S501 to S509, whose details are not repeated herein. Next, step S811 is executed by the agent program for storing another object in an extended space. The extended space is outside the isolated space and inside the storage unit. It is noted that the extended space becomes only recognized by the agent program installed on the operating system, and another object stored in the extended space is accessible only via the agent program. Please note that the extended space is extendible. The extended space is extended when the step S811 is repeated (once or several times) for storing yet another object(s) outside the isolated space and inside the storage unit. The extended space is extended to comprise the spaces that stores all the objects mentioned in the step S811. The extended space after being extended is still only recognized by the agent program installed on the operating system and the objects stored in the extended space after being extended is accessible only via the agent program.

Following that, step S813 is executed by the agent program for recording a piece of information related to the object stored in the extended space in the isolated object list. Since the scope of the extended space can be extended as addressed in the step S813, the isolated object list will be updated accordingly by the agent program whenever the scope of the extended space changed (i.e. whenever the step S813 is repeated).

In addition to the aforesaid steps, the eighth embodiment can also execute all the operations and have all functionalities set forth in the third embodiment. The eighth embodiment executing these operations and having these functionalities will be readily appreciated by those of ordinary skill in the art based on the explanation of the third embodiment, and thus will not be further described herein.

Figure 9:
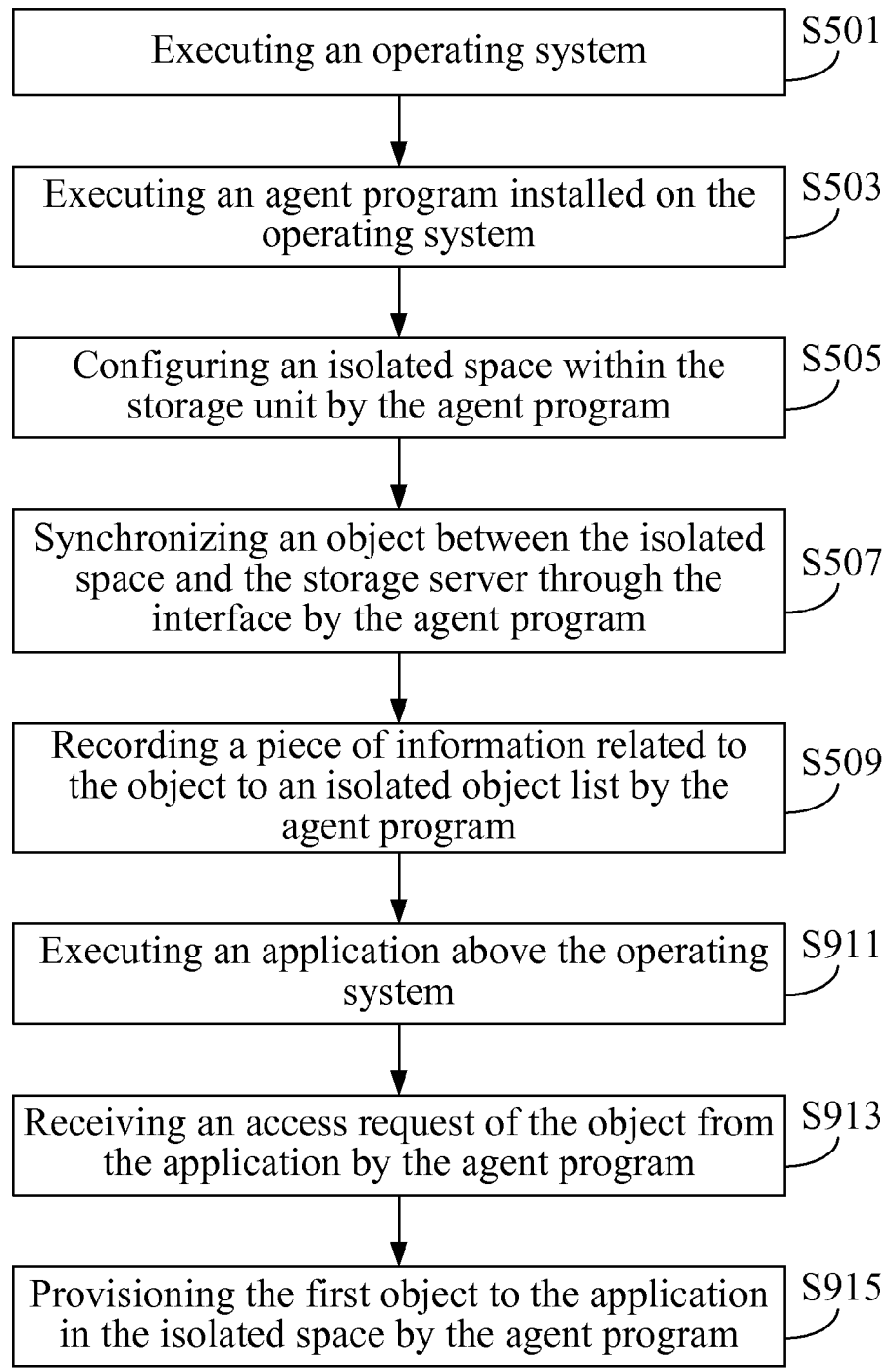
FIG. 9 is a flowchart of the secure synchronization method of a ninth embodiment of the present invention.

A ninth embodiment of the present invention is a secure synchronization method and a flowchart of which is illustrated in FIG. 9. The secure synchronization method is for use in an electronic device (e.g. the secure synchronization apparatus 11 in the third and fourth embodiments). The electronic device is electrically connected to a storage server via a network.

In this embodiment, the secure synchronization method executes step S501 to S509, whose details are not repeated herein. Next, step S911 is executed by the electronic device for executing an application above the operating system. Following that, step S913 is executed by the agent program for receiving an access request of the object from the application. After that, step S915 is executed by the agent program for provisioning the first object to the application in the isolated space.

In addition to the aforesaid steps, the ninth embodiment can also execute all the operations and have all functionalities set forth in the third and fourth embodiment. The ninth embodiment executing these operations and having these functionalities will be readily appreciated by those of ordinary skill in the art based on the explanation of the third and fourth embodiments, and thus will not be further described herein.

Moreover, people ordinary skilled in the art should be able to appreciate that some other embodiments may integrate the aforesaid steps S501 to S509, S611 to S615, S711 to S717, S811 to S813, and S911 to S915 in one embodiment. Hence, the details are not addressed herein.

The secure synchronization method described in the fifth to ninth embodiments may be implemented by a computer program having a plurality of codes. The computer program is a computer program product that can be stored in a non-transitory computer readable storage medium. When the codes are loaded into an electronic device (e.g. the secure synchronization apparatus 11 in the first to fourth embodiments), the computer program executes the secure synchronization method as described in the fifth to ninth embodiments. The non-transitory computer readable storage medium may be an electronic product, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, the present invention has an agent program installed and executed on an operating system. The agent program configures an isolated space and synchronizes any object between the isolated space and a storage server. The isolated space is only recognized by the agent program installed on the operating system, so any object stored in the isolated space is accessible only via the agent program. As a consequence, the isolated space can be deemed as a secure space for storing objects, and the secure synchronization between the isolated space and the storage server can be achieved.

Moreover, the agent program prevents an unauthorized input/output operation being performed on the object(s) stored in the isolated space by monitoring every input/output operation of the object(s) stored in the isolated space. Since the object(s) stored in the isolated space cannot be copied and made a backup to an unauthorized destination, intellectual property management can be achieved.

Furthermore, any application run above the operating system is unaware of the isolated space and the object(s) stored therein. Nevertheless, application(s) run above the operating system can access the object(s) stored in the isolated space via the agent program. Hence, compared with prior arts (remote desktop service, web-based editing tool, and digital right management), with regarding to the achievement of intellectual property management, users can enjoy the rich functionalities provided by the application(s) available in the client device (e.g. the secure synchronization apparatus 11 in the first to fourth embodiments) and bandwidth of network is consumed lightly with this invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A secure synchronization apparatus, comprising:
a storage unit;
an interface, electrically connected to a storage server via a network; and
a processing unit, electrically connected to the storage unit and the interface, configured to execute an operating system and execute an agent program installed on the operating system, the agent program configuring an isolated space within the storage unit and synchronizing a first object between the isolated space and the storage server through the interface;

wherein the isolated space is only recognized by the agent program installed on the operating system and the first object in the isolated space is accessible only via the agent program.

2. The secure synchronization apparatus of claim 1, wherein the agent program creates the first object in the isolated space and the first object is synchronized from the isolated space to the storage server by the agent program through the interface.

3. The secure synchronization apparatus of claim 1, wherein the first object is synchronized from the storage server to the isolated space by the agent program through the interface.

4. The secure synchronization apparatus of claim 1, wherein the processing unit further executes an application above the operating system, the agent program further receives an access request of the first object from the application, and the agent program provisions the first object to the application in the isolated space.

5. The secure synchronization apparatus of claim 4, wherein the agent program further determines that the first object has been modified, stores the modified first object in the isolated space, and synchronizes the modified first object from the isolated space to the storage server through the interface.

6. The secure synchronization apparatus of claim 1, wherein the agent program prevents an unauthorized input/output operation being performed on the first object by monitoring every input/output operation intending to access the first object.

7. The secure synchronization apparatus of claim 1, wherein the agent program further intercepts an input/output operation that intends to access the first object, determines that the input/output operation is unauthorized, and ignores the unauthorized input/output operation.

8. The secure synchronization apparatus of claim 7, wherein the isolated space is stored with a filtering list and the agent program determines that the input/output operation is unauthorized according to the filtering list.

9. The secure synchronization apparatus of claim 1, wherein the agent program further stores a second object in an extended space, the extended space is outside the isolated space and inside the storage unit, the extended space becomes only recognized by the agent program installed on the operating system, and the second object in the extended space is accessible only via the agent program.

10. The secure synchronization apparatus of claim 1, wherein the isolated space is stored with an isolated object list and a piece of information related to the first object is recorded in the isolated object list.

11. A secure synchronization method for use in an electronic device, the electronic device being electrically connected to a storage server via a network, the secure synchronization method comprising:
   executing an operating system;
   executing an agent program installed on the operating system;
   configuring an isolated space within the electronic device by the agent program; and
   synchronizing a first object between the isolated space and the storage server through the interface by the agent program;
   wherein the isolated space is only recognized by the agent program installed on the operating system and the first object in the isolated space is accessible only via the agent program.

12. The secure synchronization method of claim 11, further comprising:
   creating the first object in the isolated space by the agent program;
   wherein the synchronizing step synchronizes the first object from the isolated space to the storage server.

13. The secure synchronization method of claim 11 wherein the synchronizing step synchronizes the first object from the storage server to the isolated space by the agent program.

14. The secure synchronization method of claim 11, further comprising:
   executing an application above the operating system;
   receiving an access request of the first object from the application by the agent program; and
   provisioning the first object to the application in the isolated space by the agent program.

15. The secure synchronization method of claim 14, further comprising:
   determining that the first object has been modified by the agent program;
   storing the modified first object in the isolated space by the agent program; and
   synchronizing the modified first object from the isolated space to the storage server through the interface by the agent program.

16. The secure synchronization method of claim 11, further comprising:
   preventing an unauthorized input/output operation being performed on the first object by monitoring every input/output operation of the first object by the agent program.

17. The secure synchronization method of claim 11, further comprising:
   intercepting an input/output operation that intends to access the first object by the agent program;
   determining that the input/output operation is unauthorized by the agent program; and
   ignoring the unauthorized input/output operation by the agent program.

18. The secure synchronization method of claim 17, wherein the isolated space is stored with a filtering list and the determining step determines that the input/output operation is unauthorized according to the filtering list.

19. The secure synchronization method of claim 11, further comprising:
   storing a second object in an extended space by the agent program;
   wherein the extended space is outside the isolated space and inside the electronic device, the extended space becomes only recognized by the agent program installed on the operating system, and the second object in the extended space is accessible only via the agent program.

20. The secure synchronization method of claim 11, wherein the isolated space is stored with an isolated object list and a piece of information related to the first object is recorded in the isolated object list.

21. A non-transitory computer readable storage medium, having a computer program stored therein, the computer program executing a secure synchronization method after being loaded into an electronic device, the electronic device being electrically connected to a storage server via a network, the secure synchronization method comprising:
   executing an operating system;
   executing an agent program installed on the operating system;

configuring an isolated space within the electronic device by the agent program; and synchronizing an object between the isolated space and the storage server through the interface by the agent program, wherein the isolated space is only recognized by the agent program installed on the operating system and the object in the isolated space is accessible only via the agent program.

* * * * *